United States Patent [19]

König et al.

[11] 4,269,425
[45] May 26, 1981

[54] SAFETY COVERING FOR ROTARY GATING IN ARTICULATED BUSES

[75] Inventors: Karl König, Böblingen; Emil Heldmaier, Altdorf, both of Fed. Rep. of Germany

[73] Assignee: Daimler-Benz Aktiengesellschaft, Stuttgart, Fed. Rep. of Germany

[21] Appl. No.: 972,686

[22] Filed: Dec. 26, 1978

[30] Foreign Application Priority Data

Dec. 24, 1977 [DE] Fed. Rep. of Germany ....... 2758056

[51] Int. Cl.³ .............................................. B60D 5/00
[52] U.S. Cl. .................................... 280/403; 105/8 R
[58] Field of Search .................... 280/403, 424; 105/3, 105/4, 8 R, 10, 21

[56] References Cited

U.S. PATENT DOCUMENTS

| | | | |
|---|---|---|---|
| 1,844,510 | 2/1932 | Kennedy | 280/403 |
| 2,107,881 | 2/1938 | Beardsley | 280/403 |
| 2,193,155 | 3/1940 | Antoine | 280/403 |
| 2,216,547 | 10/1940 | Christianson | 105/3 |
| 2,843,417 | 7/1958 | Wahl et al. | 105/3 |

FOREIGN PATENT DOCUMENTS 1252724 10/1967 Fed. Rep. of Germany.

Primary Examiner—John A. Pekar
Attorney, Agent, or Firm—Craig and Antonelli

[57] ABSTRACT

To securely avoid any gap formation between a ring mount barrier and adjoining parts of the floor of an articulated vehicle such as a bus, a safety cover construction is carried by a turntable coupling for supporting the ring mount barrier. The safety cover construction has a U-shaped transverse cross-section defining a receiving space for receiving a lower end of the ring mount barrier with upper free ends of legs of the U-shaped cross-section in engagement therewith. The safety cover construction is formed of an elastic material, such as rubber or synthetic plastic, and thus is able to remain in engagement with the ring mount barrier despite changes in pitch and bending angles between portions of the vehicle articulated by the turntable coupling. To further assist in retaining the upper ends of the legs in engagement with the ring mount barrier, according to a preferred embodiment, a spring steel reinforcement may be embedded within the legs.

8 Claims, 5 Drawing Figures

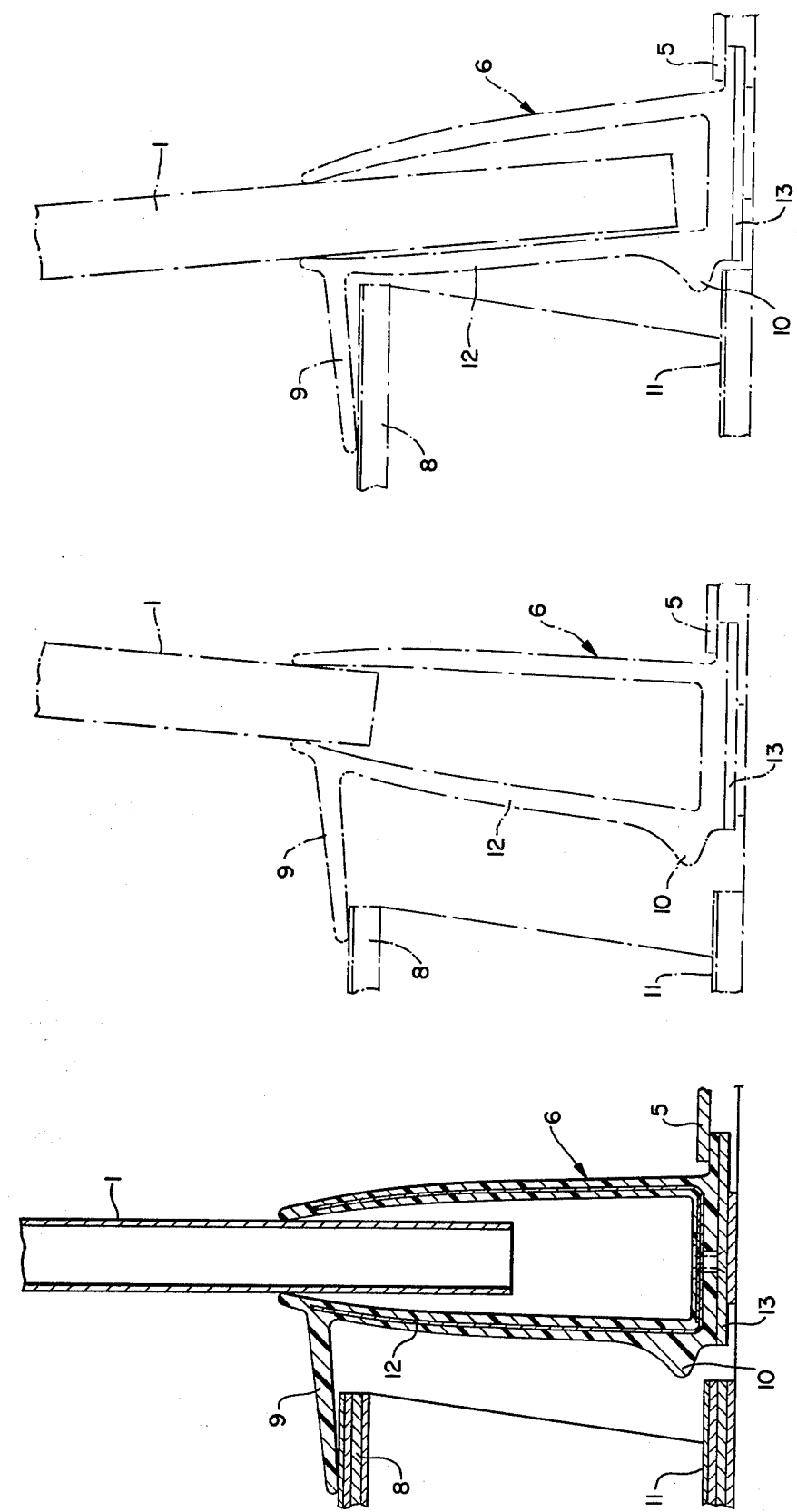

SAFETY COVERING FOR ROTARY GATING IN ARTICULATED BUSES

The invention relates to a safety cover for a ring mount barrier in an articulated bus.

All of the conventional covers constituted by sheet-metal constructions or rubber lips fail to permit the desired, large bending and pitching angles between the front car and the trailer.

Therefore, the invention is based on the problem of providing a cover for a ring mount barrier in an articulated bus which safely prevents, even in case of large angular motions between the front car and the trailer, the occurrence of open, uncovered gaps, which gaps could lead to the danger of pinching body parts or articles.

This problem has been solved according to the invention by providing that the lower zone of the ring mount barrier is guided in a safety cover, which is approximately U-shaped in cross section, consists of an elastic material, such as rubber or a synthetic resin, and is directly or indirectly attached to the turntable, in such a manner that in case of all possible bending angles and pitching angles there occurs no gap between the free ends of the U-legs and the ring mount barrier.

An especially safe covering action during all driving conditions is attained if the free ends of the U-legs converge and if the U-legs are optionally additionally provided with a preferably incorporated reinforcement of spring steel.

To securely avoid any gap formation between the ring mount barrier and adjoining parts of the floor of the bus, it is advantageous to provide that at least one lip projects approximately horizontally from one of the U-legs, this lip bridging the gap to the neighboring vehicle floor.

In accordance with a preferred embodiment of the invention, the provision is made that the lip rests on the vehicle floor.

An advantageous constructional design is finally attained by attaching the safety cover to a multipartite slip ring, which latter is connected to the turntable.

The present invention will be explained in greater detail below with reference to an embodiment illustrated in the drawing, to wit:

FIGS. 3-5 show on an enlarged scale cross sections through an installed safety cover in various driving conditions.

Figure 1:
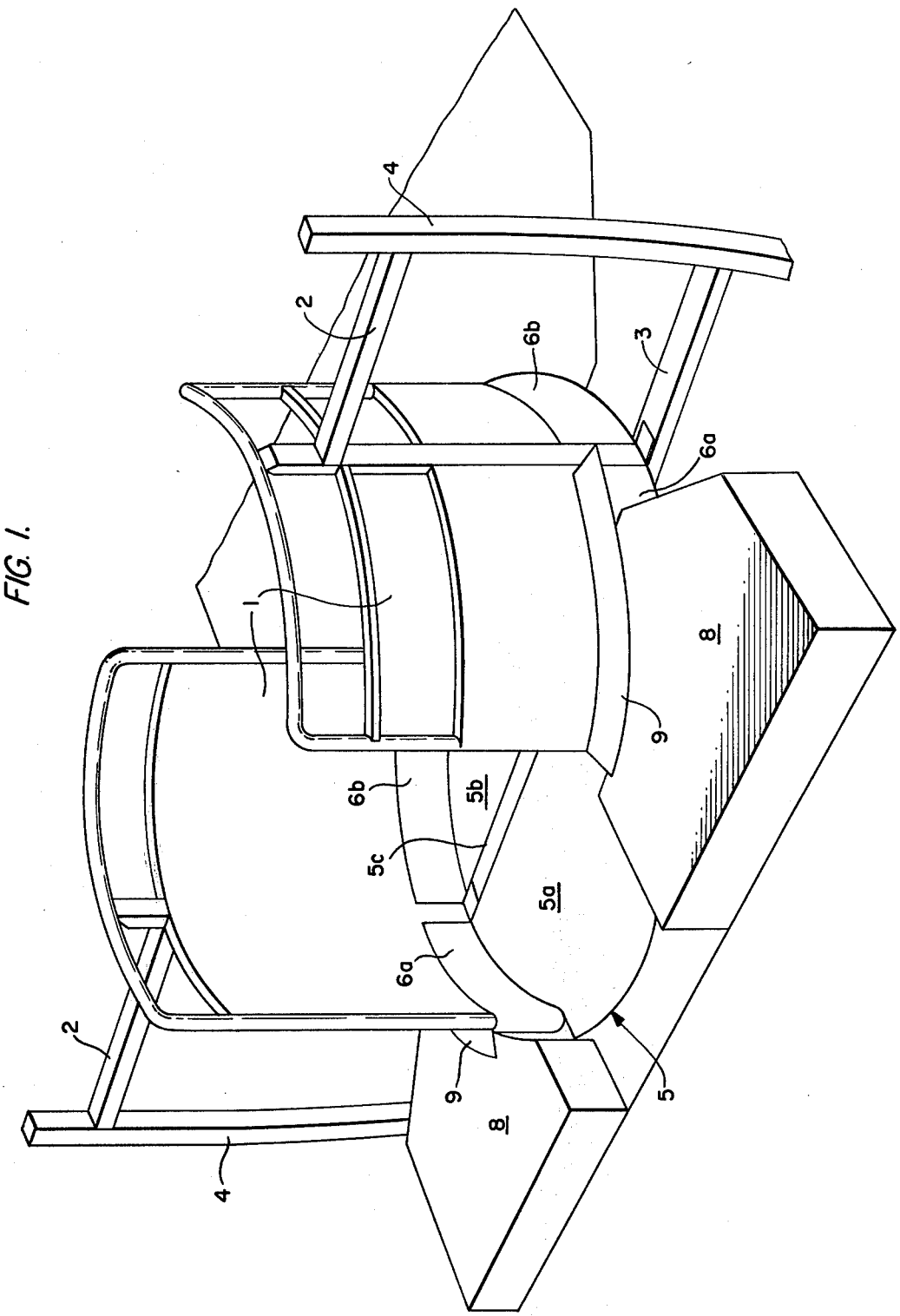
FIG. 1 is a perspective view of the total arrangement of a ring mount barrier with the safety cover according to this invention.
Figure 2:
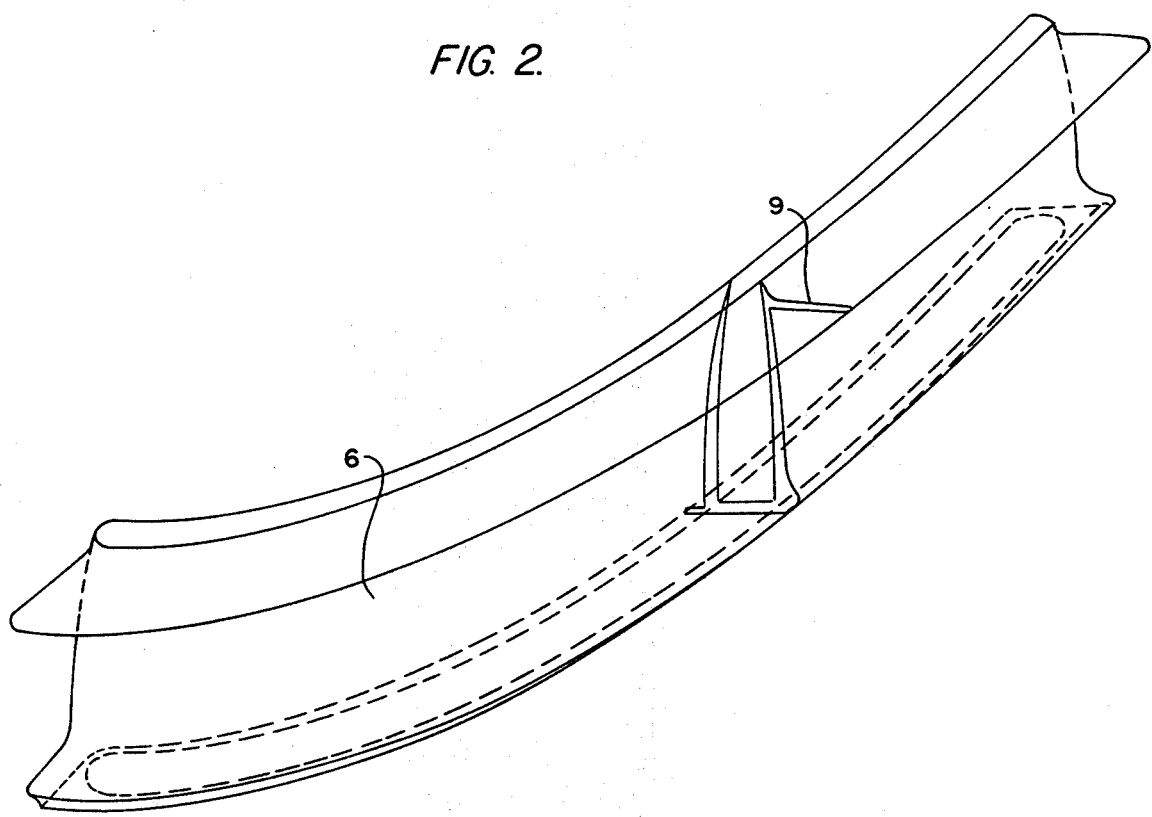
FIG. 2 is a perspective view of an individual safety cover, wherein the U-shaped cross section thereof is indicated.

FIG. 1 shows a ring mount barrier 1 consisting of two parts, this ring mount barrier being connected to an extensible center support 4 forming a closed frame by way of cross members 2 and 3, the latter of which extends over the entire width of the vehicle and is supported in the zone of the pivot bearing, not shown, of the ring mount. The floor region of the passage above the ring mount, not shown, is covered by a turn-table 5 consisting of two parts 5a, 5b, which can be swung upwardly, and a central bridge 5c, fixedly joined to the cross member 3. The lower region of the ring mount barrier 1 is covered by a safety cover 6 of a U-shaped cross section (FIG. 2). In the illustrated embodiment, this safety cover is fashioned to be bipartite for each side of the ring mount barrier 1, but it could basically also be made of one piece. Each of the two parts 6a, 6b of the safety cover is joined indirectly via a multipartite slip ring 13 to one of the foldable parts 5a, 5b of the turntable and thus follows the motions of the latter so that, during driving, relative motions are produced between the safety covers and the ring mount barriers, shown in FIGS. 3-5 of the drawing. As can be seen, in particular, from FIGS. 2-5 of the drawing, the free ends of the U-legs of the safety cover 6 converge, so that they are in firm contact with the lower zone of the ring mount barrier 1. This effect can be further enhanced by an insert 7 of spring steel, as indicated in FIG. 3.

To cover the gap between the ring mount barrier 1 and the adjoining floor region—here pedestal 8—a lip 9 projects respectively approximately in the horizontal direction from parts 6a of the safety cover, this lip resting on the topside of the pedestal 8. A further lip 10—FIGS. 3-5—serves for covering a lower floor portion 11.

FIG. 3 of the drawing illustrates the arrangement of this invention in the engineering design, while FIGS. 4 and 5 show various driving conditions.

Finally, FIG. 3 furthermore shows a reinforcement 12 of spring steel, incorporated into the safety cover 6 and increasing the contact force of the free ends of the U-legs against the ring mount barrier 1.

We claim:

1. Safety cover arrangement for a turntable articulation coupling of an articulated vehicle comprising a vertically oriented ring mount barrier and a safety cover means carried by said turntable coupling for supporting said ring mount barrier, wherein said safety cover means has a U-shaped transverse cross-section defining a receiving space for receiving a lower end of said ring mount barrier with upper free ends of legs of said U-shaped cross-section in engagement therewith, and wherein said safety cover means is formed of an elastic material for enabling the upper ends of said legs to remain in engagement with said ring mount barrier despite changes in pitch and bending angles between portions of said vehicle articulated by said turntable coupling.

2. Safety cover arrangement according to claim 1, wherein said safety cover means is formed of rubber.

3. Safety cover arrangement according to claim 1, wherein said safety cover means is formed of synthetic plastic.

4. Safety cover arrangement according to claim 1, characterized in that the free ends of the legs converge for producing firm contact with said lower end of the ring mount barrier.

5. Safety cover arrangement according to claim 1 or 2 or 3 wherein a spring steel reinforcement is embedded in said legs for producing an increased contact force between the engaged free ends and said ring mount barrier.

6. Safety cover arrangement according to claim 1, characterized in that at least one lip projects from one of the legs approximately horizontally for bridging a gap to a neighboring vehicle floor.

7. Safety cover according to claim 6, characterized in that the lip rests on the vehicle floor.

8. Safety cover according to claim 1, characterized in that said safety cover means is attached to a multipartite slip ring joined to the turntable coupling for enabling relative movement therebetween.

* * * * *